April 7, 1959 R. E. HAHN 2,881,004

PLAYABLE RECORD ALBUM

Filed Dec. 22, 1955

INVENTOR.
RALPH E. HAHN
BY
McMorrow, Berman & Davidson
ATTORNEYS 2,881,004
Patented Apr. 7, 1959

2,881,004

PLAYABLE RECORD ALBUM

Ralph E. Hahn, Gaylord, Minn.

Application December 22, 1955, Serial No. 554,758
6 Claims. (Cl. 274—1)

In a conventional phonograph record album, the records are generally kept in individual jackets, and when a stack of records is to be played upon an automatic record changer, each of the records to be played must be separately removed from its jacket, and, after it has been played, returned to the jacket.

This represents a considerable inconvenience so far as the user is concerned, and in accordance with the present invention it is proposed to provide a record album which, together with the records housed therein, can be placed bodily upon a turntable spindle of a record player without removal of the individual records. The album, further, following playing of all the records, can be lifted from the changer with the records still confined in the album for return of the album to a suitable rack. Further, the album, after the records have been played on one side, can be inverted upon the turntable spindle so as to permit the other sides of the records to be played.

An important object of the invention is to provide an album as described which will, when the records are not in use, keep the records in a dust free, fully protected container, with said container being adapted for permitting the records to be played upon a well known make of record changer without requiring removal of the records from the container.

Another object is to provide an album as stated that can be readily stored either in a horizontal or vertical position when not in use, and can be readily identified through the use of suitable coloring, labels, etc., as to the records contained therein.

A further object is to provide an album of the type referred to that will be usable directly upon the turntable and spindle of a conventional record changer without requiring modification or redesign of said changer.

Other objects will appear from the following description, the claims appended thereto, and from the annexed drawing, in which like reference characters designate like parts throughout the several views, and wherein:

The album constituting the present invention has been particularly designed for holding a quantity of records playable at 45 r.p.m. Records of this type have a large diameter center opening, receiving a correspondingly large spindle of a record changer designed for the playing of this particular type of record.

It should be noted, however, at this point that although the album has been illustrated in association with a number of records of this particular type, quite possibly it may be adapted for holding other types of records on their associated record changer spindles. In this instance, some modifications of the construction may be necessary, but the basic principles of operation would be retained.

Figure 1:
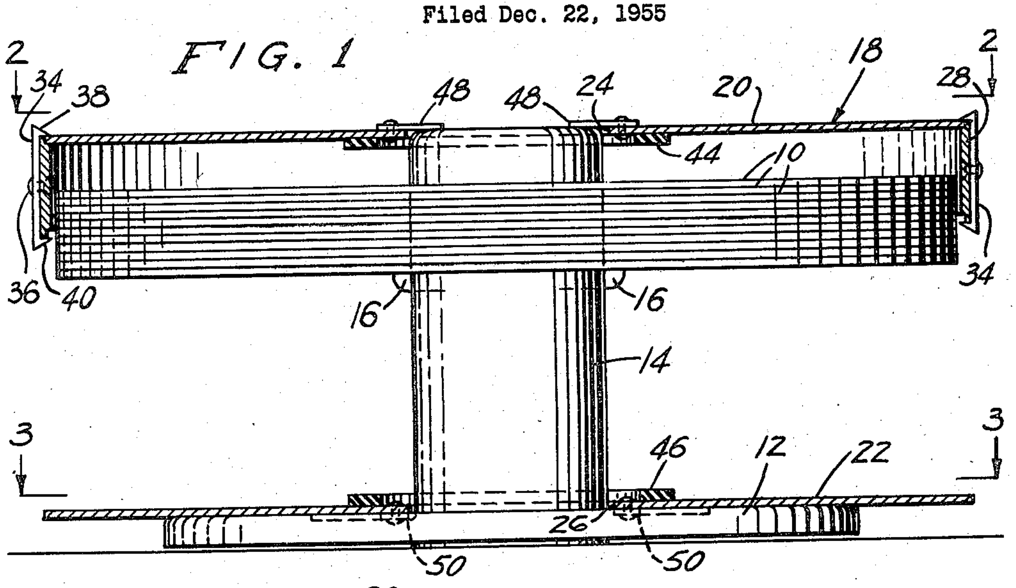
Figure 1 is a longitudinal sectional view through the album showing the same while in use upon a conventional turntable and spindle of an automatic record changer, during the playing of a stack of records.

The records supported in the album have been designated by the reference numeral 10, and are shown in Figure 1 being played upon an automatic record changer including a turntable 12 from which projects upwardly a large diameter spindle 14 passing through the center openings of the records. At diametrically opposite locations upon the spindle there are provided the usual record shelves 16, 16.

The album constituting the present invention has been generally designated at 18, and includes identical but opposite end plates 20, 22. These are flat, of circular outer configuration, and are slightly greater in diameter than the diameters of the supported records 10. In manufacture of the device the end plates are constructed identically so as to produce the cost of construction and permit mass production.

Formed in the respective top plates are center openings 24, 26 of a diameter slightly greater than the diameter of spindle 14.

Figures 2, 3, 4, 5:
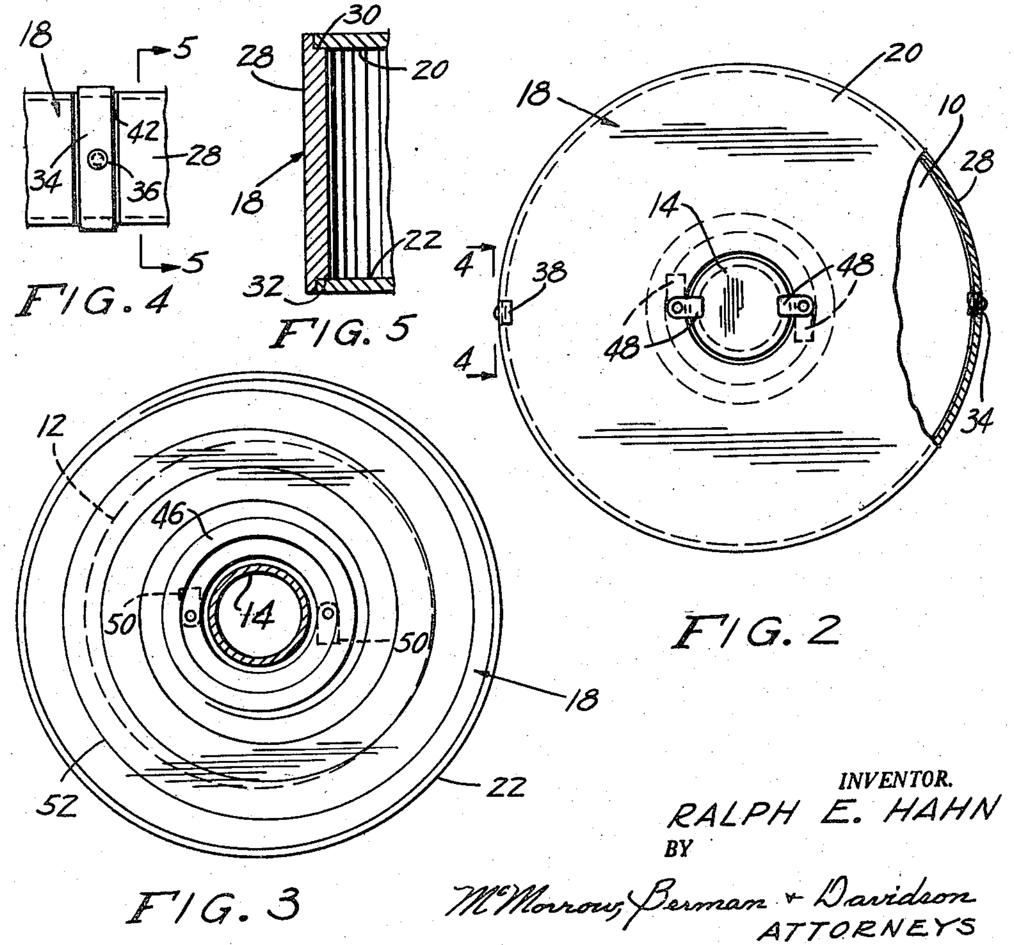
Figure 2 is a top plan view, portions being broken away, of the device as seen from line 2—2 of Figure 1, on a reduced scale.
Figure 3 is a sectional view on line 3—3 of Figure 1, also on a reduced scale.
Figure 4 is an enlarged, fragmentary elevational view showing the latch means of the album as seen from the line 4—4 of Figure 2.
Figure 5 is a detail sectional view, still further enlarged, on line 5—5 of Figure 4.

A circular rim 28 is provided with inwardly facing recesses 30, 32 in its top and bottom edges as shown in Figure 5. The recesses extend continuously through the full circumference of the rim, to receive the peripheries of the top and bottom plates.

At diametrically opposite locations upon the rim, there are provided spring catches 34, 34. These are each formed of a length of leaf spring material, anchored medially between its ends to the rim as at 36, and tensioned at its opposite ends into face-to-face contact with the rim.

At the ends of each spring catch, there are provided inwardly directed teeth or fingers 38, 40, overlying the adjacent peripheral portions of the top and bottom plates, to normally hold said plates assembled with the rim when the album is not in use.

The spring catches, as shown in Figure 4, are disposed in recesses 42 formed in the outer surface of the rim and extending from top to bottom of the rim.

Cemented or otherwise fixedly secured to one face of each end plate is a dust ring, the dust rings being designated at 44, 46 respectively and having inner diameters somewhat greater than the diameters of the center openings 24, 26. The dust rings can be made of felt, soft rubber, or other suitable material, and when the end plates are assembled with the rim through the medium of the spring catches, with a stack of records 10 disposed between the end plates, the outermost records of the stack will be engaged by the dust rings through the full peripheries of their center openings, as a result of which all the records will be kept in a dust free condition. The dust rings, further, comprise shock absorbent cushions, which will prevent damage to the records in the event the album is accidentally dropped or brought forcibly against an adjacent surface.

On the faces of the end plates opposite those to which the dust rings are secured, there are provided pairs of tabs 48, 48 and 50, 50 respectively. The tabs are pivotally connected at one end to the end plates adjacent the center openings, and are swingable between inoperative and operative positions shown in dotted and full lines respectively in Figure 2. In their operative positions, the tabs project radially, inwardly within the center openings of the respective end plates.

In that face of each end plate to which the dust ring is secured, there is formed a spiralling or eccentric groove 52 extending substantially fully from the periphery of the end plate to the dust ring.

In the use of the album, under ordinary conditions the end plates are both assembled with the rim with the records confined therebetween in engagement with the dust rings 44, 46. Under these circumstances, the album may be placed either in a horizontal or in an upright position in a suitable rack, awaiting use.

There would be marked upon one of the end plates a list of all the selections on the sides of the records faced toward said end plate. On the other end plate there would be marked the selections on the opposite sides of the records. In this way, one can determine what selections will be played when the album is disposed with a selected end plate upwardly disposed, upon a turntable spindle. Further, the end plates and rims can be suitably colored so as to identify the type of selections on the housed records, that is, one color may be used for hymns, another color for classical selections, etc.

In any event, assuming that a stack of records is to be played, the album is grasped with both hands, with the thumbs on top. Then, with the fingers against the lower end of the end plates, the tabs of said lower end plates are retracted to the dotted line position shown in Figure 2. The tabs of the upper end plate, in the illustrated example the end plate 20, are now shifted to their operative positions with the thumbs.

The album is now placed upon the spindle and the fingers are used to shift outwardly the teeth 40 of the spring catches against the restraint of the inherent springiness of said catches. The lower end plate (in the illustrated example the plate 22) will now drop to the record shelves 16.

The reject button of the changer is now pushed and when the changer cycles the lower end plate 22 will fall to the turntable and the tone arm will drop into the eccentric groove 52. The changer will immediately go into the change cycle due to the provision of the eccentric groove and the lowermost record will now drop and be played. The cycle is repeated until the entire stack is played. After the last record is played the lower end plate 22 is lifted with all the records supported thereupon, and with the thumbs on the end plate 20 until the lower end plate snaps into place in the recess 32 of the rim. The teeth, in this connection, have sloped outer surfaces to provide cam surfaces whereby the teeth will be biased outwardly, temporarily, when the lower end plate approaches the rim.

When the lower end plate has been snapped into place in the rim the entire unit is lifted from the spindle.

To play the other sides of the records, the album is merely flipped over, and the entire process is repeated in the same manner as discussed above.

It will be apparent from the above that the album is so designed that the records need never be removed therefrom, and there is no necessity of extracting the records from individual jackets, or returning them to place. Instead, the album and the records are placed as a unit upon the turntable spindle, and responsive merely to detachment of the lower end plate, and disposition of the tabs of the upper end plate in engagement with the top of the spindle, the entire unit is ready to be played.

The album can of course be made of any suitable material, such as a hard plastic.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A record album adapted for supporting a stack of records upon a turntable spindle of an automatic record player in position to be played, comprising: identical but opposite end plates having confronting inner surfaces formed with spiralling grooves, said plates having spindle-receiving center openings; a rim spacing the end plates apart for disposition of a plurality of records therebetween; tab means movably mounted on at least one of the respective end plates for manual adjustment between inoperative positions in which the tab means lies exteriorly of the edge of the center opening of said one end plate, and operative positions in which said tab means extends across said edge to support said one end plate upon the spindle; and means releasably holding the end plates assembled with the rim.

2. A record album adapted for supporting a stack of records upon a turntable spindle of an automatic record player in position to be played, comprising: identical but opposite end plates having confronting inner surfaces formed with spiralling grooves, said plates having spindle-receiving center openings; a rim spacing the end plates apart for disposition of a plurality of records therebetween; tab means movably mounted on at least one of the respective end plates for manual adjustment between inoperative positions in which the tab means lies exteriorly of the edge of the center opening of said one end plate, and operative positions in which said tab means extends across said edge to support said one end plate upon the spindle; and means releasably holding the end plates assembled with the rim, comprising spring catches secured to the rim at locations spaced circumferentially of the rim.

3. A record album adapted for supporting a stack of records upon a turntable spindle of an automatic record player in position to be played, comprising: identical but opposite end plates having confronting inner surfaces formed with spiralling grooves, said plates having spindle-receiving center openings; a rim spacing the end plates apart for disposition of a plurality of records therebetween; tab means movably mounted on at least one of the respective end plates for manual adjustment between inoperative positions in which the tab means lies exteriorly of the edge of the center opening of said one end plate, and operative positions in which said tab means extends across said edge to support said one end plate upon the spindle; and means releasably holding the end plates assembled with the rim, comprising spring catches secured to the rim at locations spaced circumferentially of the rim, each catch being anchored medially between its ends to the rim and having at its ends inwardly extending teeth overlying the end plates.

4. A record album adapted for supporting, in position to be played, a stack of records upon the spindle of the turntable of an automatic record player, comprising: idencal but opposite end plates having spindle-receiving center openings and having confronting inner faces formed with grooves spiralling from the peripheries of the plates toward said center openings; a rim spacing the end plates apart for disposition of a plurality of records therebetween; a plurality of tabs pivoted on each end plate on axes perpendicular to the general plane of the plate adjacent the center opening thereof, said tabs being swingable about said axes between inoperative positions outside of the circumference of the center opening and operative positions in which the tabs extend across said circumference to support the associated end plate upon said spindle; and means releasably holding the end plates assembled with the rim.

5. A record album adapted for supporting, in position to be played, a stack of records upon the spindle of the turntable of an automatic record player, comprising: identical but opposite end plates having spindle-receiving center openings and having confronting inner faces formed with grooves spiralling from the peripheries of the plates toward said center openings; a rim spacing the end plates apart for disposition of a plurality of records therebetween; means releasably holding the end plates assembled with the rim; a plurality of tabs mounted on each end plate adjacent said center opening thereof, for adjustment between inoperative positions outside of the circumference of the center opening and operative positions in which the tabs extend radially, inwardly toward the center of the opening to support the associated end plate upon said spindle.

6. A record album adapted for supporting, in position to be played, a stack of records upon the spindle of the turntable of an automatic record player, comprising: identical but opposite end plates having spindle-receiving center openings and having confronting inner faces formed with grooves spiralling from the peripheries of the plates toward said center openings; a rim spacing the end plates apart for disposition of a plurality of records therebetween; means releasably holding the end plates assembled with the rim; a plurality of tabs mounted on each end plate adjacent said center opening thereof, for adjustment between inoperative positions outside of the circumference of the center opening and operative positions in which the tabs extend radially, inwardly toward the center of the opening to support the associated end plate upon said spindle; and endless dust rings concentric with and extending about the center openings of the respective end plates on the grooved faces of the end plates to engage the records confined between the end plates and prevent dust passing through the center openings from impinging upon the records.

References Cited in the file of this patent

UNITED STATES PATENTS

| | | |
|---|---|---|
| 903,918 | Thrower | Nov. 17, 1908 |
| 1,057,671 | Rogers | Apr. 1, 1913 |
| 1,137,126 | Fuller | Apr. 27, 1915 |
| 1,926,606 | Ward | Sept. 12, 1933 |
| 1,952,054 | Black | Mar. 27, 1934 |
| 2,344,919 | Kelly | Mar. 21, 1944 |
| 2,601,426 | Baumann | June 24, 1952 |
| 2,678,861 | Funk | May 18, 1954 |
| 2,777,699 | Woodruff | Jan. 15, 1957 |